US006181177B1

United States Patent
Chapman

(12)
(10) Patent No.: US 6,181,177 B1
(45) Date of Patent: *Jan. 30, 2001

(54) BASELINE CORRECTION CIRCUIT FOR PWM DATA READBACK SYSTEMS

(75) Inventor: Dale Brian Chapman, San Jose, CA (US)

(73) Assignee: International Business Machines Corporation, Armonk, NY (US)

( * ) Notice: Under 35 U.S.C. 154(b), the term of this patent shall be extended for 0 days.

This patent is subject to a terminal disclaimer.

(21) Appl. No.: 09/030,104

(22) Filed: Feb. 25, 1998

Related U.S. Application Data

(62) Division of application No. 08/585,982, filed on Jan. 16, 1996, now Pat. No. 5,757,751.

(51) Int. Cl.[7] .................................................. H03K 3/017
(52) U.S. Cl. ........................ 327/172; 327/558; 369/124
(58) Field of Search .................................. 327/90, 18–20, 327/37, 63, 64, 170, 172, 176, 551–553, 558, 563; 369/54, 58, 124

(56) References Cited

U.S. PATENT DOCUMENTS

| Re. 31,160 | 2/1983 | Kinjo ...................................... 369/124 |
| 3,838,448 | 9/1974 | Garde et al. ............................ 360/45 |
| 4,071,781 | * 1/1978 | Kayalioglu ............................ 327/165 |
| 4,342,059 | 7/1982 | Wray ..................................... 360/123 |
| 4,490,691 | 12/1984 | Dolby .................................... 333/14 |
| 5,057,785 | 10/1991 | Chung et al. ......................... 328/162 |
| 5,168,180 | * 12/1992 | Bayer et al. .......................... 327/558 |
| 5,204,848 | 4/1993 | Cardero et al. ....................... 369/48 |
| 5,264,804 | * 11/1993 | Fox ........................................ 327/558 |
| 5,265,085 | 11/1993 | Jaquette et al. ..................... 369/24 X |
| 5,300,826 | * 4/1994 | Okanobu et al. ...................... 327/563 |
| 5,317,143 | 5/1994 | Yoshimoto et al. ............... 250/201.5 |
| 5,392,317 | * 2/1995 | Cho et al. ................................ 375/76 |
| 5,412,632 | 5/1995 | Mita et al. ............................. 369/48 |
| 5,757,751 | * 5/1998 | Chapman ............................... 369/54 |

FOREIGN PATENT DOCUMENTS

| 0 393 633 A2 | 10/1990 | (EP) . |
| 0 414 548 A2 | 2/1991 | (EP) . |
| 0 418 100 A2 | 3/1991 | (EP) . |
| 0 466 329 A2 | 1/1992 | (EP) . |
| 1 375 869 | 11/1974 | (GB) . |

* cited by examiner

Primary Examiner—My-Trang Nu Ton
(74) Attorney, Agent, or Firm—Altera Law Group, LLC

(57) ABSTRACT

A baseline correction circuit (BCC) that compensates for the offset present on a PWM signal in an optical readback system when associated transients first appear in the PWM signal, and then compensates for the decay in the PWM signal so that significant baseline variations are minimized. The BCC includes a BCC switch coupled to switch the PWM signal responsive to a control unit and a low pass filter coupled through the BCC switch to receive the PWM signal. The low pass filter includes a capacitor coupled between the PWM signal and a ground reference, which stores the voltage of the baseline variation. A difference amplifier is connected to receive the low pass filtered output and also the PWM signal, and to provide a difference signal responsive to the difference between these two signals. The resultant signal is a high-pass filtered version of the PWM signal originally supplied to the BCC. A control unit monitors and controls disk operations, and supplies a transient event signal indicative of a predetermined upcoming baseline variation in the PWM signal, which turns on the BCC switch. At a predetermined time after the transient event has occurred and the baseline voltage has been stored on the capacitor in the low pass filter, the control unit switches off the BCC switch, and the signal from the low pass filter decays at a rate approximately following the input PWM signal into the BCC. Advantageously, such a baseline correction circuit can minimize the dynamic range requirements necessary to handle baseline variations.

10 Claims, 8 Drawing Sheets

BASELINE CORRECTION CIRCUIT FOR PWM DATA READBACK SYSTEMS

This is a divisional of U.S. patent application Ser. No. 08/585,982, filed Jan. 16, 1996, now U.S. Pat. No. 5,757, 751.

BACKGROUND OF THE INVENTION

1. Field of the Invention

The present invention relates to recording readback systems for data recovery, and particularly to optical disk file data recovery systems.

2. Description of the Related Art

Conventional large capacity information storage systems utilize magnetic or optical disk drive systems to store large amounts of information while still providing good access times. One important aspect of a disk drive unit is the readback system that processes the information read from the disks. Such a readback system often includes a number of electrical circuits. A well-designed readback system should provide accurate, reliable, data readout at a high speed and still be cost effective. As for most electrical circuits, cost reduction can be achieved by designing readback circuits for reduced power consumption and reduced chip space.

Conventional magnetic disk drives, including hard disk units and floppy disk units, have many advantages. Magnetic disk drive units can both read and write. The storage capabilities of hard drive units have been steadily increasing, such that one gigabyte disk drive units with very fast access times in a standard computer form factor are becoming common. On the other hand, floppy disk drives are substantially slower and have much smaller capacities, but still remain popular primarily due to convenience. Floppy disk drives allow disks to be inserted and removed for use by other users and in other computers.

Optical disk units combine the benefits of large storage capacity, fast access times, and removability. In an optical disk drive unit, a laser beam is directed to an optical disk that has data stored on it in a predetermined format. The reflected light is detected by one or more photodetectors that provide an electrical signal which can then be processed by a readback circuit. Optical disk drive units can provide significantly greater storage than magnetic disks and also provide significantly faster access times. Several types of disk drive units are currently available: CD-ROM (Compact Disk-Read Only Memory) units, WORM (Write-Once, Read-Many) units, and MO (Magnetic-Optical) units.

For reading only, CD-ROM (Compact Disk-Read Only Memory) units are available at a price that makes them attractive to many computer users. CD-ROM disks can be manufactured inexpensively, they are portable, and have large storage capacity. However, CD-ROM disks are not writeable because the digital data is stored in a plurality of permanent indentations on the disk.

WORM units provide write capability for one time only. To write data, WORM units direct a laser beam to create grooves in data sectors of special disks. Once written, a WORM disk cannot be easily erased and re-written, and therefore WORM units have been used mostly for archival purposes.

MO units, on the other hand, provide unlimited capability to both read and write on an MO disk. Each track on an MO disk includes MO data sectors and relatively small ROM sectors for identifying the MO sector that follows. The MO data sectors are designed to allow writing a series of magnetic marks. To read the magnetically-marked data sectors, the laser beam is directed to each of the marks which changes the beam's polarization upon its reflection from the magnetically-marked area on the disk. The polarization change in the reflected beam is detected by two photodetectors. Although MO units provide large amounts of data storage and very fast data access in a removable disk, MO units have not yet become extremely popular for read/write uses, at least in part due to their large cost in comparison to magnetic hard drive units.

One standard data format for optical disks is PPM (Pulse Position Modulation). In a PPM format, data is stored in the form of a series of like-size spots, and the information content is in the distance between the like-size spots. Up until now, PPM has also been conventional for MO units. However, PWM (Pulse Width Modulation) recording, which has been used for CD-ROM units, is now being applied to MO uses. In a PWM recording, information is stored in a series of variable-sized "spots" and the information content is in the distance between the transitions, or "edges", and therefore the spot size becomes critical. An example of PWM's application to MO units is disclosed in U.S. Pat. No. 5,204,848 to Cardero et al, entitled "Adjusting Amplitude Detection Threshold by Feeding Back Timing-Data Phase Errors". PWM recording can advantageously increase storage densities by 50% or more in the same disk area. However, this new technology has created new problems. One significant problem is that the readback path for PWM-formatted data cannot have a high-pass filter with a high (e.g. 300–500 KHZ) threshold. This problem, in turn creates difficulties in correcting baseline variations.

Baseline variations regularly occur in the signal read directly from the disk, and are particularly troublesome in optical readback systems. A "baseline" is a reference value that approximates the level of an electrical readback signal between the highest and lowest excursions of that signal. At least two types of baseline variations are significant: rapidly occurring (transient) baseline variations which occur normally during operation and slow baseline variations caused by voltage decay of the coupling capacitors, which causes the baseline to drop gradually. The gradual decay is at a rate sometimes called the "slew rate".

Transient baseline variations can be caused during normal operation by switching functions within the recording system. In optical recording systems, these transients are especially severe and prevalent. For example, transients may be caused by such events as a change in data types from the read only memory (ROM) header to the magneto-optical (MO) data region. Another cause of transients is a change in laser light level when changing from write, erase, or standby illumination levels to read illumination levels. Other transients occur when laser illumination passes from an area of the disk that has been erased to an area of the disk that has data. In order to provide reliable data detection, the amplitude and length of these baseline variations should be reduced as much as possible.

In readback systems, transient baseline variations have usually been handled by high pass filters including AC coupling capacitors. In order to handle severe baseline variations, a high pass filter could be designed with a high cutoff frequency, such as 500 kilohertz, that allows the circuit to compensate quickly for transients. Such a high pass filter is commonly used for PPM readback systems. However, as mentioned above, a high cutoff frequency in the range of 300–500 KHz is inappropriate for PWM systems.

As mentioned above, a high pass filter with a high cutoff frequency can adequately filter out transients in conventional PPM systems. However, the faster and more effective PWM systems such as disclosed in U.S. Pat. No. 5,204,848, issued to Cardero, et al., and assigned to the assignee of the present invention, can have problems, such as false lockups, if the high pass filter has too high a cutoff frequency. Therefore, effective operation of PWM systems requires that the high pass filter should have a relatively low pass cutoff frequency such as 2 KHz. Unfortunately, a lower cutoff frequency would allow a significant portion of the transient baseline variation to progress through the entire data recovery process, disadvantageously requiring additional dynamic range to supply the necessary increased accuracy. To provide a high dynamic range, very expensive electrical components may be necessary to supply the required number of bits of resolution. One such expensive component is an ADC (Analog-to-Digital Converter). A high dynamic range could require, for example, a high speed 10-bit ADC, whereas a lower dynamic range could require only a 7-bit ADC. It would be an advantage to provide a system that prevents transients from progressing through the entire data recovery process, and thereby significantly reduces the impact of transient baseline variations on the dynamic range requirements of the system.

The second type of baseline variation is a gradual drop in the baseline caused by the slow decay of the coupling capacitors while recovering from a baseline variation. This gradual drop occurs at a rate sometimes termed the "slew rate". Typical baseline restoration circuits for recording systems include a diode that prevents a signal from having so much offset that the signal is clipped. Such circuits do not provide precision baseline restoration. It would be an advantage to provide a system that compensates for the slew rate of the coupling capacitors and thereby further reduces the dynamic range requirements of the system.

In summary, it would be an advantage to provide a system that substantially reduces the dynamic range requirements of the readback circuit, by responding quickly to transient baseline variations. It would be a further advantage if the system follows the slew rate, so that, throughout the signal from the readback circuit appears to follow an approximately flat baseline.

SUMMARY OF THE INVENTION

The baseline correction circuit (BCC) described in this disclosure provides a system that compensates for the offset present on a PWM (Pulse Width Modulation) signal when associated transients first appear in the PWM signal. It subtracts this offset and then compensates for the decay in the PWM signal at a rate equivalent to the decay rate for the coupling capacitors preceding the baseline connection circuit. The baseline correction circuit can quickly recover from transient baseline variations and compensate for the decay (droop) from the coupling capacitors, so that significant baseline variations are minimized. Advantageously, such a baseline correction circuit can minimize the dynamic range requirements necessary to handle baseline variations and thereby provide a lower cost readback system that is particularly useful for PWM readback circuits in an optical readback and recording system. Furthermore, compatibility with PPM systems is possible if the baseline correction circuit is left on so that it operates as a high pass filter. Such a readback system can be used to read both PPM (Pulse Position Modulation) disks and PWM disks.

The Baseline Correction Circuit (BCC) described herein filters a pulse width modulated (PWM) electrical signal responsive to a transient event signal supplied from a control unit for an optical disk system. The control unit monitors and controls disk operations, and from this information, supplies a transient event signal indicative of a predetermined upcoming baseline variation in the PWM signal. The BCC includes a switch coupled to switch the PWM signal responsive to the transient event signal and a low pass filter coupled through the BCC switch to receive the PWM signal. The low pass filter includes a capacitor coupled between the PWM signal and a ground reference, which stores the voltage of the baseline variation. A difference amplifier is connected to receive the low pass filtered output and also the PWM signal, and to provide a difference signal responsive to the difference between these two signals. The resultant signal is a high-pass filtered version of the PWM signal originally supplied to the BCC. At a predetermined time after the transient event has occurred and the baseline voltage has been stored on the capacitor in the low pass filter, the control unit switches off the BCC switch, and the signal from the low pass filter decays at a rate approximately following the droop rate of the input PWM signal into the BCC.

DETAILED DESCRIPTION OF THE PREFERRED EMBODIMENT

This invention is described in a preferred embodiment in the following description with reference to the Figures, in which like numbers represent the same or similar elements. While this invention is described in terms of the best mode for achieving this invention's objectives, it will be appreciated by those skilled in the art that variations may be accomplished in view of these teachings without deviating from the spirit or scope of the invention.

Figure 1:
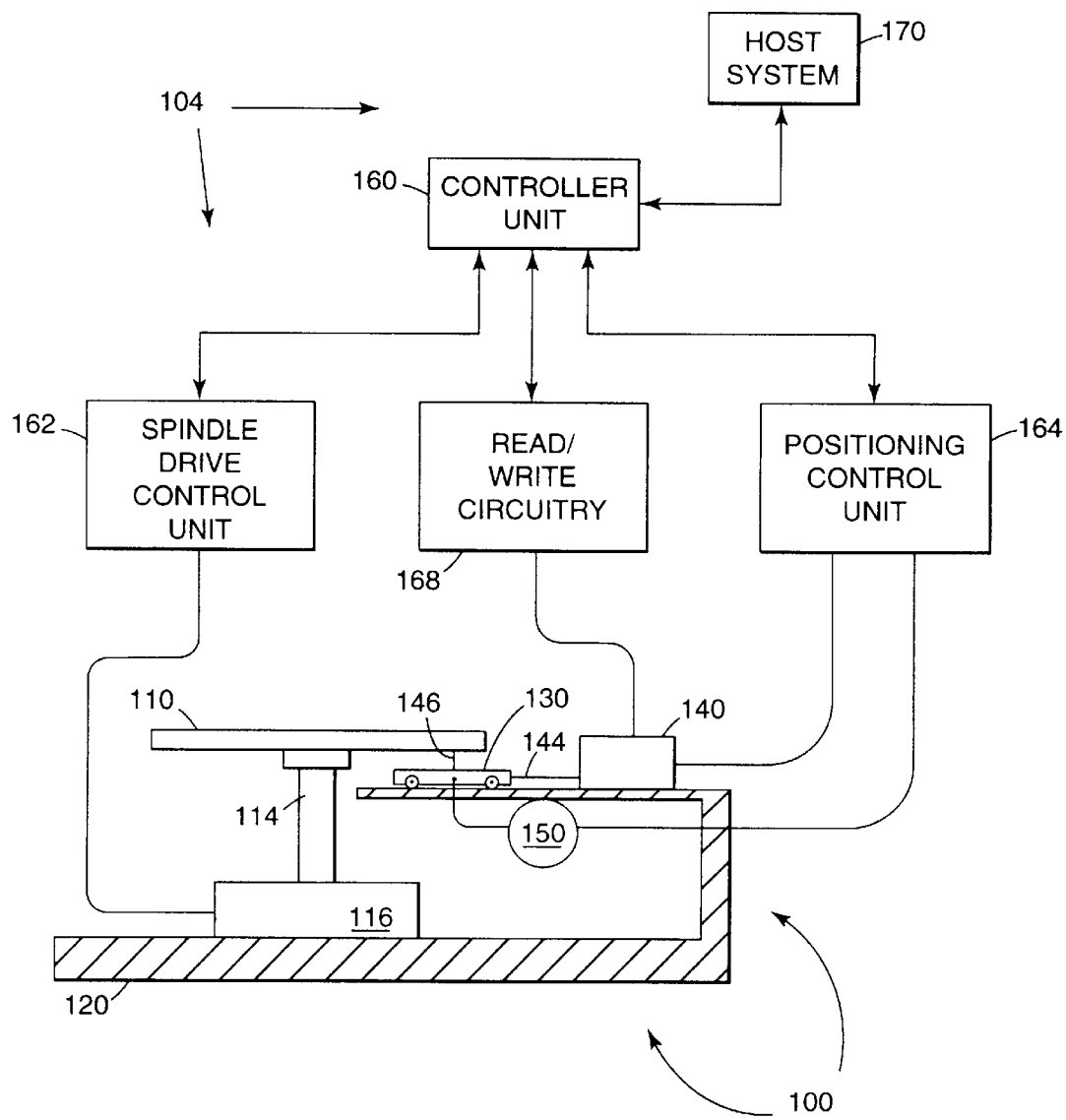
FIG. 1 is a side view of a simplified optical disk drive and a block diagram of associated control circuitry.

FIG. 1 is a side view of a simplified optical disk drive designated by a general reference number 100 and a block diagram of associated control circuitry designated by a general reference number 104. The disk drive system 100 comprises an optical disk 110 mounted to a spindle 114. The optical disk 110 may be removable from the disk drive unit or it may be permanently affixed therein. The optical disk may comprise an erasable disk, a WORM (Write-Once, Read-Many) disk, or a conventional CD-ROM disk. The spindle 114 is attached to a spindle motor 116 that rotates the spindle 114 and disk 110. A chassis 120 provides a housing for the disk drive system 100. The spindle motor 116 and a slidable, movable mount 130 are attached to the chassis 120. The slidable mount 130 includes optics, such as one or more lenses, mirrors, prisms, and beamsplitters and moves responsive to control from a controller unit 160 to position itself to read from any track on the optical disk 110. A laser and optical processing housing 140 includes a laser that generates a laser beam 144 that is directed via optics in the slidable mount 130 to the optical disk 110. The housing 140 also houses photodetectors that detect the light reflected from the optical disk 110. The photodetectors convert the light intensity into an electrical signal. A motor 150 is attached to chassis 120 and to the slidable mount 130.

The controller unit 160 provides overall control to the system 100. The controller unit 160 typically includes (not shown) a central processing unit (CPU), a memory unit, and other digital circuitry, although it should be apparent that these aspects could also be enabled as hardware logic by one skilled in the computer arts.

The following configuration allows controller 160 to control rotation of the optical disks 110 and to position the sliding mount. The controller unit 160 is connected to a spindle drive unit 162 that controls the spindle motor 116 and to a positioning control unit 164 that is connected to control the position of the slidable mount 130 and thereby to direct the laser beam 146 to a particular track on the disk 110. The controller 160 is also connected to read/write circuitry 168, which is coupled to the laser and optics housing 140 to control, for example, the light intensity supplied by the laser. Another use of the read/write circuity 168 is to receive the electrical signals from the photodetectors that detect the light reflected off the optical disk 110. A host system 170, typically a computer system, is connected to the controller unit 160. The host system 170 may send digital data to the controller 160 to be stored on the optical disk 110.

Figure 2:
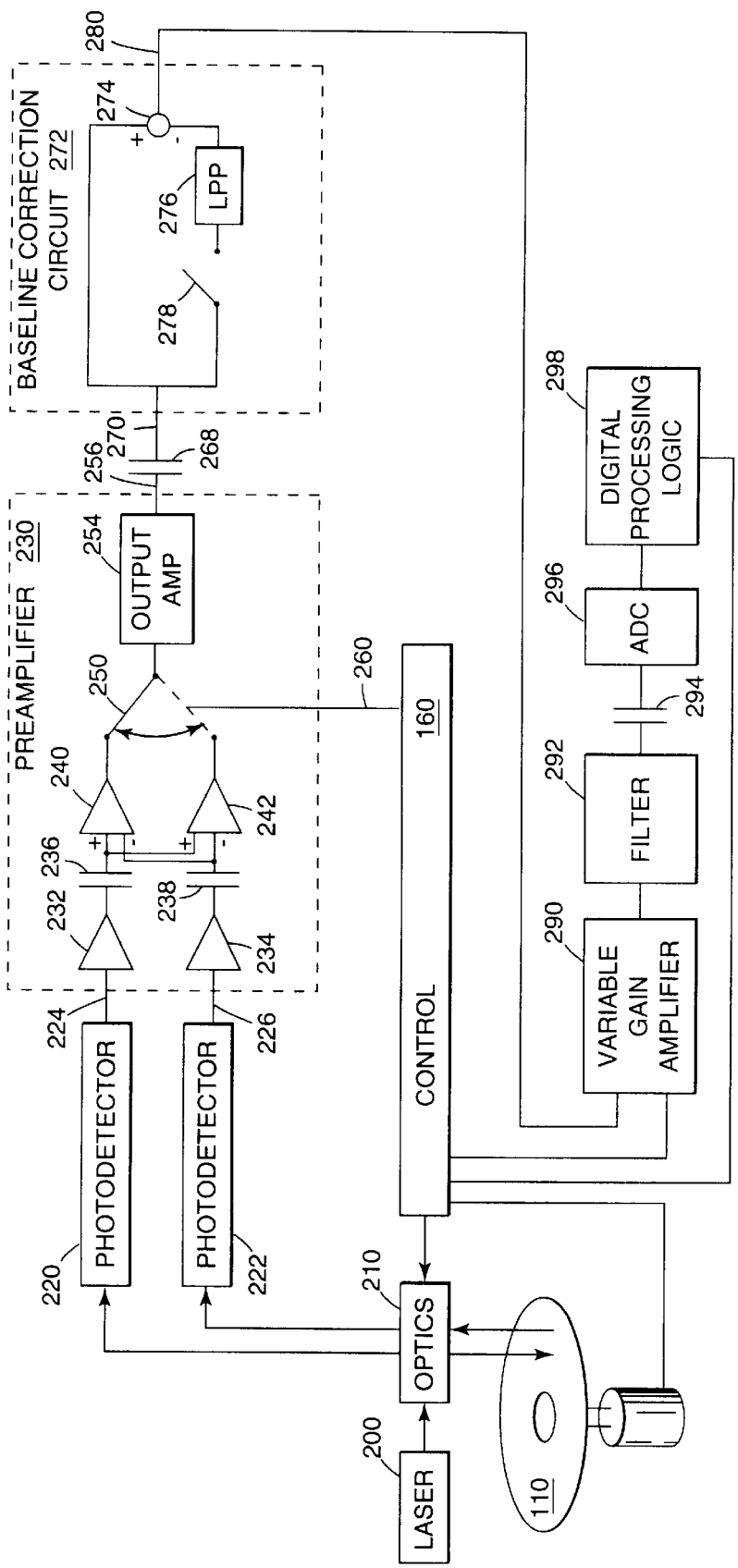
FIG. 2 is a schematic and block diagram of readback circuitry and components for one embodiment of an optical disk drive system.

Reference is now made to FIG. 2 which is a schematic and block diagram of the read back circuitry and components for one embodiment of an optical disk drive system. Light from a laser 200 is directed into a set of optics 210, through which the light is directed onto the optical disk 110 and the reflected beam is directed to light sensing devices such as photodiodes. Particularly, the optics set 210 includes lenses, mirrors, and beamsplitters to direct the laser beam in a preferred polarization from the laser 200 to the disk 110 and to receive the reflected beam from the disk. The optics set 210 includes a conventional polarization selecting configuration to separate the reflected beam into a first and a second beam each having a separate polarization. The first beam is directed to a first photodetector 220 and the second beam is directed to a second photodetector 222 that convert the incident light intensity respectively to a first electrical signal 224 and a second electrical signal 226. A preamplifier 230 receives the electrical signals 224 and 226 and processes it in a way appropriate for the recording method used on the optical disk 110, as will be described.

Reference is again made to FIG. 2. The preamplifier 230 includes a first transimpedance amplifier 232 coupled to receive the first electrical signal 224 from the first photodetector 220 and a second transimpedance amplifier 234 coupled to receive the signal from the second photodetector 222. In this early part of the preamplifier 230, a first stage of high pass filtering is useful, and therefore a first stage high pass filter for each signal includes a first coupling capacitor 236 and a second coupling capacitor 238 shown respectively following each of the first and second transimpedance amplifiers. However, it should be apparent to one skilled in the art that the coupling capacitors 236 and 238 could be positioned elsewhere in the circuit.

The output of the first transimpedance amplifier 232 is applied through a first coupling capacitor 236 to a summing amplifier 240 and a difference amplifier 242. Likewise, the output of the second transimpedance amplifier 234 is applied through a second coupling capacitor 238 to the summing amplifier 240 and the difference amplifier 242. Typically, the summing amplifier 240 and difference amplifier 242 have different gains to make the output signal more uniform; i.e., the modulated data signals out of the preamp, be they ROM or MO, have the same amplitude, regardless of their baselines. Furthermore, the summing amplifier 240 and the difference amplifier 242, with variations that are normal in production, have different offset voltages (i.e. different baselines) on their outputs.

The preamplifier 230 includes circuitry, represented by a preamp switch 250 to select either the signal from the summing amplifier 240 or the signal from the difference amplifier 242. The selected signal is supplied from the preamp switch 250 to an output amplifier 254 that supplies a preamp output 256. The state of the preamp switch 250 that selects either the difference amplifier 240 or the summing amplifier 242 is controlled by a logic control line 260 from the control unit 160 in accordance with the tape of disk and data being read. The type of disk being read is determined by the control unit 160. When the optical disk 110 is a WORM or ROM disk in which data is detected by intensity variations, the preamp switch 250 will be connected to the path from the summing amplifier 240. If the data has been recorded on the disk as Write Once Read Many (WORM) or Read Only Memory (ROM) data, then the data on the disk will cause the intensity of the light reflected from the disk to be modulated. In these "intensity-modulated" disks, the intensity of the light falling on the two photodetectors 220 and 222 will vary similarly and with the same phase relationship. The current developed by the two photodetectors 220 and 222 is converted to a voltage by the transimpedance amplifiers 232 and 234 and then these voltage mode signals are added. In some embodiments, the signal from just one of the two photodetectors 220 or 222 could be used in the data detection process.

When the optical disk 110 is an MO (Magneto-Optical) disk, in which data is detected by polarization shifts, the preamp switch 250 will be connected to the difference amplifier 240. In an MO disk, data is recorded by changes in the magnetic alignment of the thin film material on the disk. Data recorded by the MO system is detected by a small change in polarization of the light reflected from the optical disk 110 rather than an amplitude change. The optics system 210 processes this change in light polarization with the result that there will be a difference in the light intensity falling upon the two photodetectors that is proportional to the change in polarization. The light on the photodetectors 220 and 222 causes them to produce a current that is converted to a voltage by transimpedance amplifiers 232 and 234. The MO signal is realized in the difference amplifier 242 by taking the difference between the signals from the two photodetectors.

Figure 3:
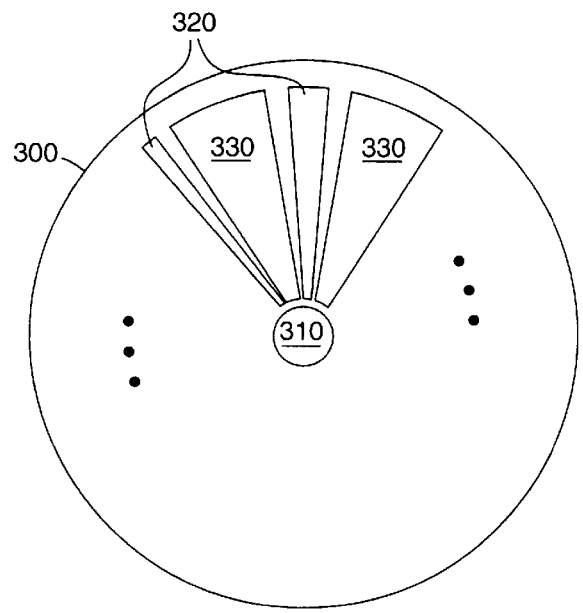
FIG. 3 is a plan view of a typical magneto-optical (MO) disk, illustrating ROM sectors and MO sectors thereon.

Reference is briefly made to FIG. 3, which illustrates the sectors on a typical first generation MO disk. Beginning at a center 310, the sectors are arranged in the manner of spokes extending from the center. The MO disk has two basic types of sectors: ROM 320 sectors and MO 330 sectors. Each ROM sector 320 is associated with an adjacent MO sector 330, and includes a sector mark and identification data that identifies the specific MO sector associated with it. The identification data in the ROM sector 320 can include a track and a sector number. Second and third generation MO disks (not shown), are divided into radial bands that have different data rates to maximize the amount of data that can be placed on a disk. The readout circuit described herein could be used with second and third generation MO disks, as well as first generation MO disks.

Each MO sector 330 includes data stored in a magneto-optic manner, which is read back by detecting a polarization shift in the laser light reflected therefrom. Therefore data in the MO sector 330 is read by taking the difference between the two signals from the photodetectors. However, each ROM sector 320 includes data read by detecting the intensity of the reflected light, and therefore, unlike MO data, the ROM data cannot be read by taking the difference, but instead most appropriately is detected by taking the sum of the two signals from the photodetectors 220 and 222 (FIG. 2). As a result, the preamplifier 230, which is the circuit that performs the sum or difference processing, must regularly switch between difference processing for the MO mode and sum processing for the ROM mode. To accomplish the change in mode, the control circuit constantly monitors and controls the position of the optical beam on the disk 110 (FIG. 2), and adjusts a preamp switch in the preamplifier 230 according to the type of field being read. A change in the state of the preamp switch 250 can cause transient voltages. Because the summing circuit can have a different offset voltage (a different baseline) than the difference circuit. The offset differences, unless filtered will propagate through the entire system as a step function, disadvantageously requiring higher dynamic range in the subsequent circuitry.

In summary, the summing amplifier 240 processes the signal from ROM and WORM data, while the difference amplifier 242 is used for processing MO data.

The output signal from the switch 250 is applied to the output amplifier 254 which provides the preamp output 256. The preamp output 256 is applied through a coupling capacitor 268 which provides a second stage of high pass filtering, to supply an input 270 to a Baseline Correction Circuit (BCC) 272 which is described in more detail subsequently. Briefly, the baseline correction circuit 272 includes a summing circuit 274 coupled to receive the input 270 from the preamp output 256. The difference input of the summing circuit 274 is coupled to the output of a switched low pass filter 276. Particularly, the preamp output 256 is coupled to a BCC switch 278 that switches the preamp output 256 either "on" or "off". One result is that, when the BCC switch 278 is closed, an output 280 from the BCC 272 will appear to have been high pass filtered. However, when the switch is open, the preamp output signal is applied directly to the output of the BCC 272, offset by any voltage still remaining in the low pass filter 276. Thus, during transients, the BCC 272 is optimally switched on to minimize those transients, while subsequently during data readout, the BCC switch 278 is turned off and the voltage on the low pass filter 276 is allowed to drain off at a rate approximately compensating for the droop in the coupling capacitors preceding it in the circuit.

After the BCC circuit 272, the output signal 280 is applied to the remainder of the data detection circuitry. As an example, in the schematic and block diagram of FIG. 2, the BCC output 280 is provided to a variable gain amplifier 290 which adjusts the gain of the overall system, then to a filter 292, then to a coupling capacitor 294, which provides a third stage of AC coupling, and then to an ADC (Analog-to-Digital Converter) 296. The digital output of the ADC 296 is connected to digital processing logic 298, which completes the data detection process. In some embodiments, the ADC 296 and logic 298 could be replaced with analog circuitry that would perform the data detection process.

Figure 4:
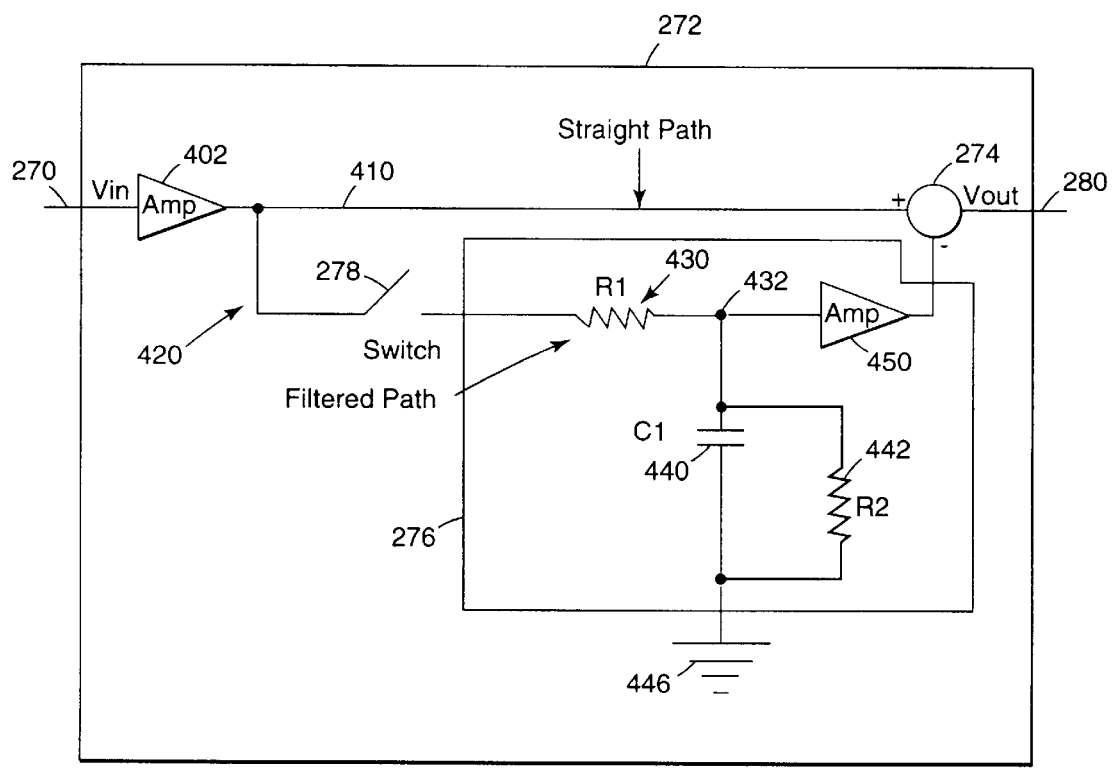
FIG. 4 is a block diagram of the preferred embodiment of the baseline correction circuit (BCC).

A block diagram of the preferred embodiment of the BCC circuit 272 is shown in FIG. 4. The filtered output 270 from the preamplifier 230 (FIG. 2) is supplied to an input amplifier 402 that provides a high impedance link. From the input amplifier 402, two separate paths are provided to the summer circuit 274: a straight-line path 410 and a filtered path 420. The straight-line path 410 connects directly to a plus (+) input to the summer 274, and the filtered path 420 connects, via the electronic switch 278 and the filter 276, to a minus (−) input to the summer 274.

The embodiment of the filter 276 in FIG. 4 includes a resistor 430 having a value R1 coupled to the switch 278 and an output node 432. A capacitor 440 having a value C1 and a resistor 442 having a value R2 are coupled in parallel between the output node 432 and a ground reference voltage 446. An output amplifier 450 is coupled to the output node 432 in order to provide a high impedance connection between the output node 432 and the "−" input to the summer 274.

When the switch 278 is closed, the signal is applied to the low pass filter 276. The high frequency portions of the signal are absorbed by the resistor 430 while the low frequency signal components appear across the capacitor 440. The low frequency components of the signal will be stored on the capacitor 440. The voltage appearing on the output node 432 (across capacitor 440) passes through the high input impedance amplifier 450 to be subtracted from the original input signal in the summer circuit 274. The net effect, is that when the switch 278 is closed, the output signal 280 from the BCC 272 appears to have been high pass filtered:

$$V_{Out} = V_{input} - V_{input} \times \frac{1}{R1 \times C1 \times S + 1} = V_{input} \times \frac{R1 \times C1 \times S}{R1 \times C1 \times S + 1}$$

When the switch is open, the response will be $$V_{Out} = V_{input} - V_{C1_{(initial)}} \times e^{-\frac{t}{R2 \times C1}}$$

At the moment when the switch 278 is first opened, the initial baseline voltage of the input signal is stored on capacitor 440. In the summer circuit 274, this baseline voltage stored on the capacitor 440 is subtracted from the actual input signal to compensate for the baseline voltage. Immediately, the input baseline will begin decaying away. To compensate for the decay in the input baseline voltage, the voltage on the capacitor 440 is bled off by resistor 447 at a rate that is chosen to minimize the error between the voltage on the capacitor C1 and the baseline of the actual input signal. This rate, which may be determined by one skilled in the art conventionally determines the values for C1 and R2.

Figure 5:
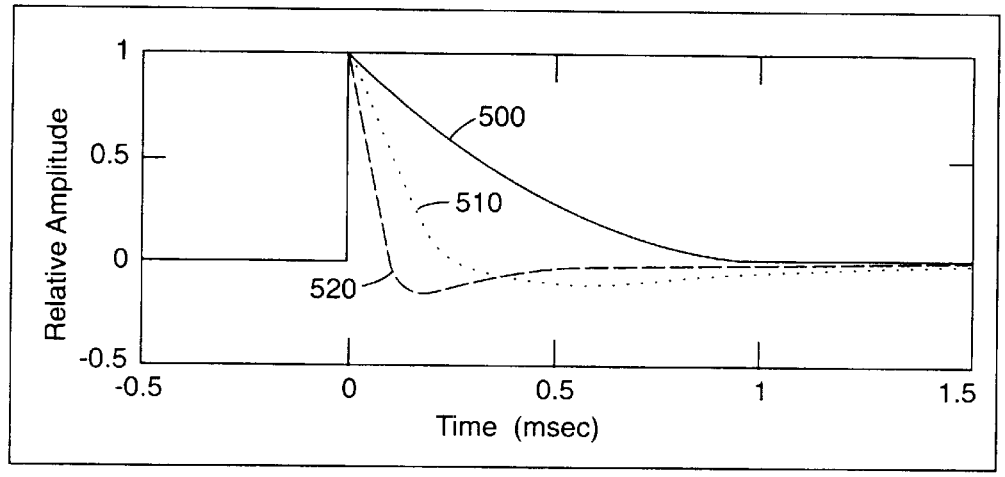
FIG. 5 is a graph that illustrates normal baseline variations present from a transient event at time zero.
Figure 6:
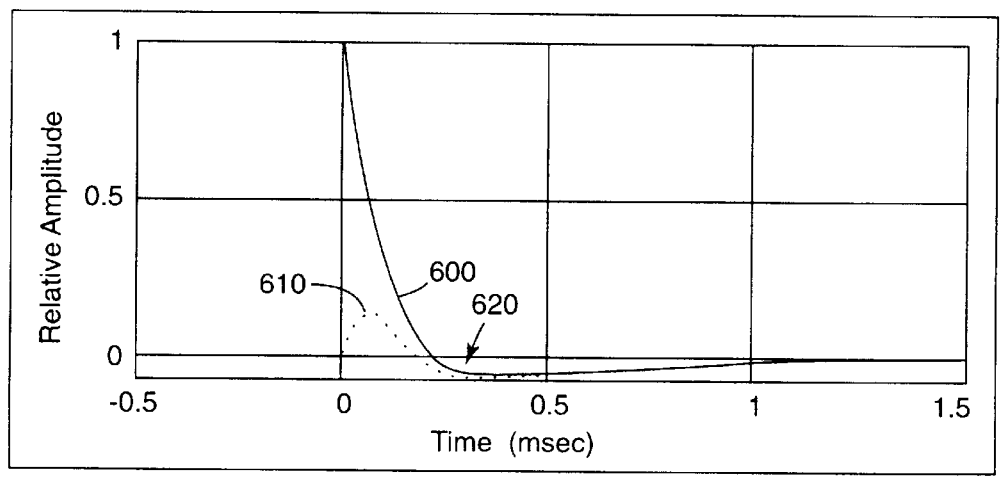
FIG. 6 is a graph that illustrates smoothing of baseline variations by the baseline correction circuit described herein.

Reference is now made to FIGS. 5 and 6 to illustrate the effect of the BCC 272. FIG. 5 is a graph that illustrates normal baseline variations present from a transient experienced at time zero. A solid line 500 shows the normalized response of one stage of high pass filtering such as would appear after the first coupling capacitors 236 and 238 (FIG.

2). A dotted line 510 shows the normalized response of two stages of high pass filtering such as would appear at the input 270 to the BCC 272, which is subsequent to the second coupling capacitor 268 (FIG. 2). A dashed line 520 shows the normalized response of three stages of high pass filtering that would occur if another passive high pass filter followed the second coupling capacitor 268. In order for reliable data detection to take place, the amplitude of these baseline variations must be reduced. The BCC 272 can substantially reduce these baseline variations, as will be shown in FIG. 6.

FIG. 6 is a graph that shows smoothing of the baseline variations by the BCC 272 from a transient experienced at time zero. A solid line 600 shows the input 270 into the BCC 272 after two stages of high pass filtering. A dotted line 610 shows the output voltage on the BCC output 280 from the input 600. It can be seen from FIG. 6 that the BCC initially absorbs much of the transient in the first approximately 0.2 milliseconds, and subsequently, as shown by 620, droops and recovers in accordance with the original signal.

Figure 7:
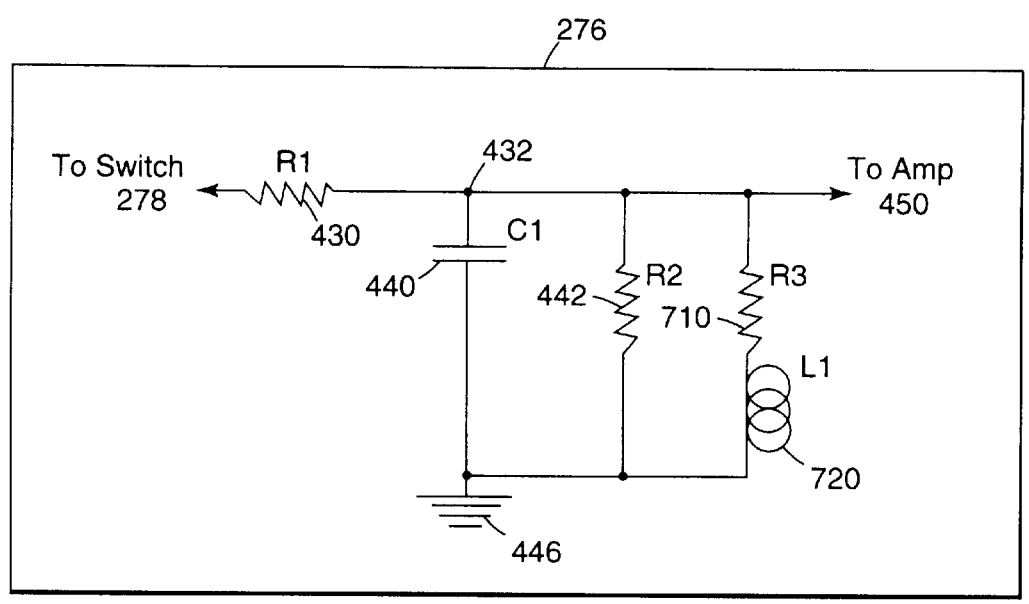
FIG. 7 is an alternate embodiment of the low pass filter for the baseline correction circuit.

There will be some mismatch between the droop of the coupling capacitors 268 and 236 or 238 and the droop of the BCC circuit 272 because the overall system (including the preceding circuits) has more than one stage of AC coupling. In other words, more than one stage causes the high pass filter system to have an undershoot. Unfortunately, the low pass filter shown in FIG. 4 does not compensate for this undershoot and therefore some part of the undershoot will continue on to the rest of the system. It is possible to make the low pass filter more complex so that it also has an undershoot response to a step input and such a filter is shown in FIG. 7. Reference is briefly made to FIG. 7, which is an alternate embodiment of the low pass filter 276 that includes a resistor 710 and an inductor 720 coupled in series between the node 432 and the ground 446. In other words, the resistor 710 and inductor 720 are coupled in parallel with the resistor 442 and the capacitor 440. Although this embodiment could be useful for some applications, the high cost of the parts for the filter shown in FIG. 7 would likely be too large to justify the small gain made in dynamic range.

In system use, when a switching operation is performed that will potentially cause a transient baseline variation, the BCC switch 278 is closed for a short time, just long enough for the filter 276 to charge up to the transient voltage. The BCC switch 278 is then opened. As the input signal 270 droops from the coupling capacitor stages, the voltage on capacitor 440 C1 will bleed off and correct for the change in input voltage to a first order approximation.

In some embodiments, the switch 278 may be left closed to switch the system into a high frequency, high pass filter operation. This can be desirable for backwards compatibility operation with PPM recorded disks. In practice, the BCC 272 has been implemented with a multiplicity of digitally selected low pass filters so that the circuit can be programmed for several different disk types.

Figure 8:
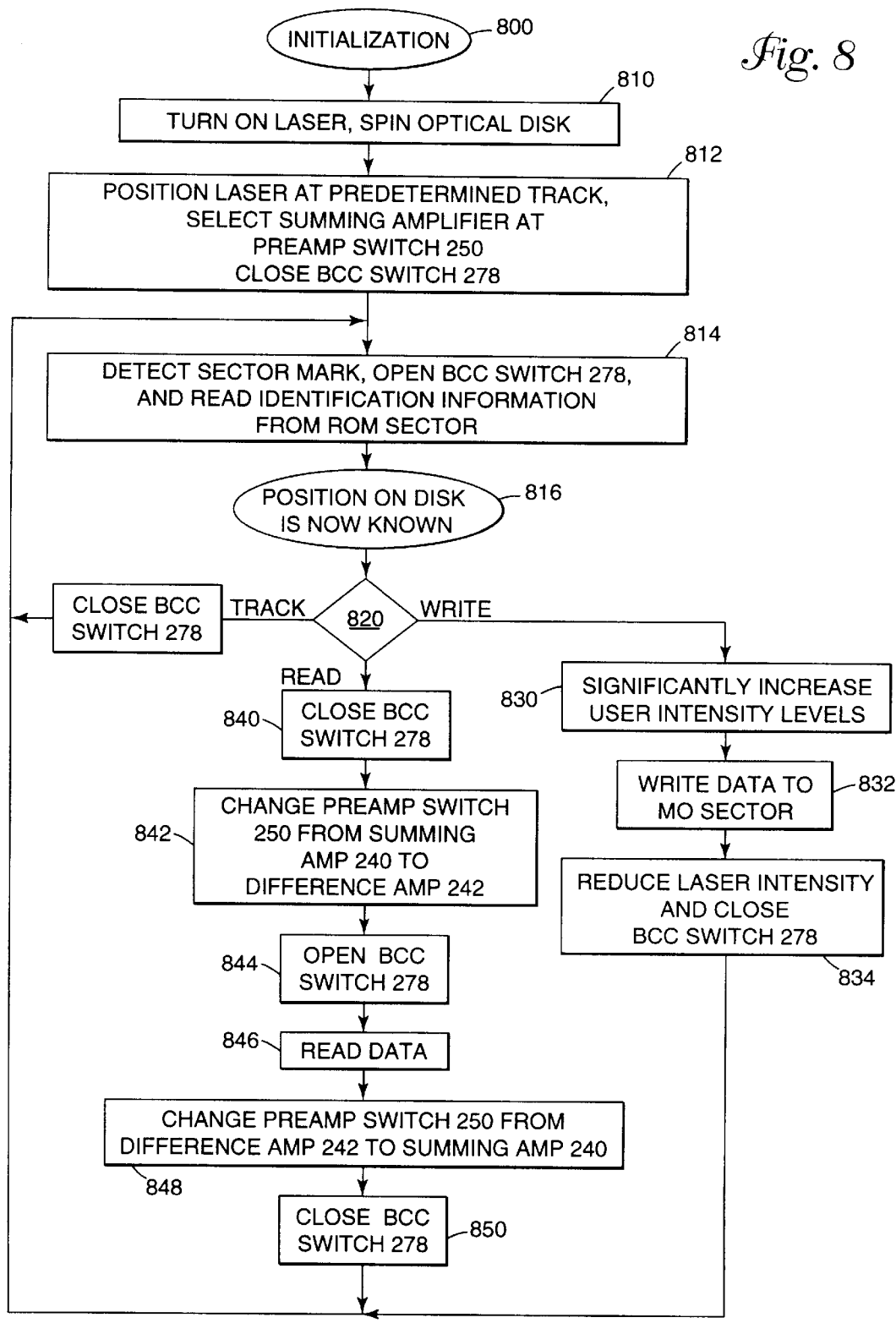
FIG. 8 is an example of operation in the control system to initialize and perform further operations, including reading and writing the optical disk.
Figure 9:
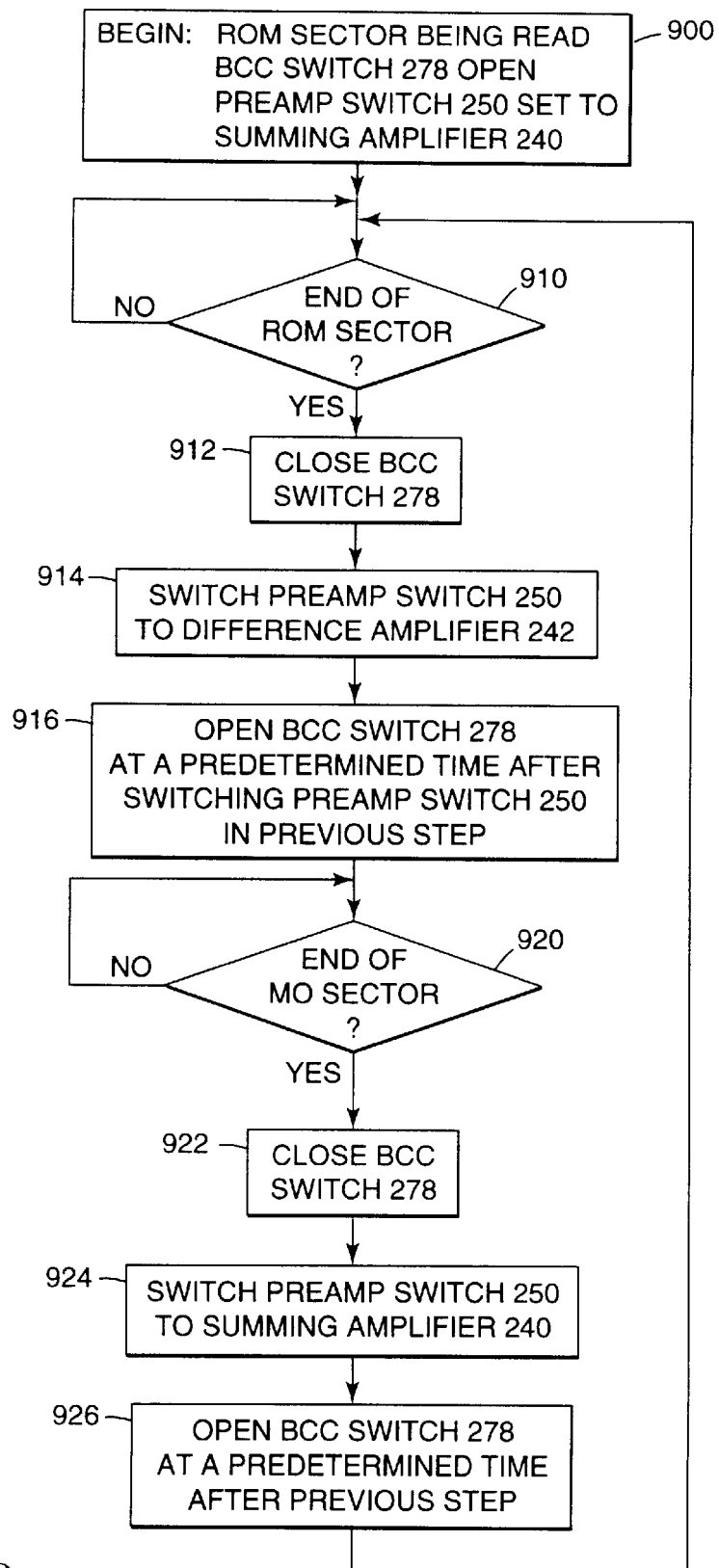
FIG. 9 is a flow chart illustrating normal operations that utilize the baseline correction circuit switch to smooth transients and to compensate for droop caused by the coupling capacitors.

Reference is now made to FIG. 8 which is an example of operation in the control system to initialize and perform further operations on the optical disk 110. FIG. 9, discussed subsequently, is a flow chart illustrating regular operations to utilize the BCC switch 278 to smooth transients.

Initialization begins at 800. At about 810 the laser is turned on and the optical disk begins spinning. At box 812 the laser is positioned at a predetermined track on the optical disk, the summing amplifier 240 is selected by appropriately toggling the preamp switch 250, and the BCC switch 278 is closed.

Next, at 814, a sector mark is detected on the optical disk, which indicates the beginning of a ROM sector. The BCC switch 278 is opened and the identification information is read from the ROM sector and, at 816, an indication is made that the position of the laser on the disk is now known.

At 820 the decision to track, read, and write is illustrated. Tracking is useful to maintain accurate knowledge of the disk position while awaiting a command from the control unit 160 (FIGS. 1 and 2) to read and write. To track, operation exits the decision box 820 and at 822, the BCC switch 278, is closed to absorb the transient from the next sector mark. Operation then returns to 814 to detect the next sector mark. However, if the control unit 160 signals a write operation, then operation exits the decision box 820 and moves to a box 830, at which the laser intensity levels are significantly increased. Next, at 832, data is written to the MO sector after which, at 834 the laser intensity is reduced and the BCC switch 278 is closed to absorb the transient from the next sector mark, and operation returns to the box 814 to detect the next the next sector mark.

If the control unit 160 signals a read operation, then operation moves from the decision box 820 to a box 840, at which the BCC switch 278 is closed. Next, at 842 the preamp switch 250 is changed from the summing amp 240 to the difference amp 242, thereby causing a transient. Subsequently, at 844, the BCC switch 278 is opened at a predetermined time after the preamp switch 250 changes state. Subsequently, at 846, data is read from the MO disk and at 848, the preamp switch 250 is changed from the difference amp 242 to the summing amp 240. At 850, the BCC switch 278 is closed and then operation returns to box 814 to read the next sector mark.

FIG. 9 is a flow chart illustrating normal operations that utilize the BCC switch 278 to a smooth a transient baseline variation in the PWM signal, and also to compensate for the droop caused by the coupling capacitors.

At 900, operation begins at a state in which the ROM sector is being read, the BCC switch 278 is open, and the preamp switch 250 is set to receive the summing amplifier 240. At 910, operation waits until the end of the ROM sector is known, either by direct information or, preferably by knowledge of the length of the ROM sector and knowledge of when the ROM sector began. After the end of the ROM sector, at 912, the BCC switch 278 is closed and at 914 the preamp switch 250 is switched to connect the difference amplifier 242 to the readback path. At 916, the BCC switch 278 is opened at a predetermined time after switching the preamp switch 250 in the previous step 914. Data continues to be read from the MO section until, as illustrated at 920, the end of the MO sector had been reached. Subsequently, at 922, the BCC switch 278 is closed to absorb the transient caused by the upcoming switching operation.

In addition to the baseline variations resulting from normal switching between sectors, there are several other potential causes for the baseline variations when reading data from optical disks. One potential cause of baseline variation arises from the unipolar nature of the optical signals. That is, they do not swing plus or minus about their "no signal" operating point. The optical signal is always to one side of the no signal operating point. Thus, an MO signal may have settled such that the coupling capacitors block the DC content and the signal is swinging symmetrical about zero. Meanwhile, there is no ROM signal and the low pass filter for the ROM path is conditioned for "no signal". When the ROM signal arrives it will initially swing between zero and some positive (or negative) value. This will, unfortunately, cause a step function in the signal baseline of the signal out of the preamp.

Another cause of a baseline change is a variation of laser intensity. If a disk is just following a track without reading or writing, a lower power level is applied to the laser than is used for reading. When the time comes to read, the laser power will be increased and, unless filtered, a step function will be seen on the Summing Amp path.

The laser intensity also changes while transitioning from a write operation to a read operation, which causes an undesirable step function. Because the intensity level supplied by the laser when writing is very much higher than the intensity level for reading data, the control system adjusts the light intensity downward to read data. If the preamp is "on" during the write operation, then the preamp will become saturated with a high voltage, which, upon a subsequent read will be reduced causing an undesirable step function. However, sometimes during a write operation the preamplifier 230 may be squelched (i.e. turned off) to prevent the preamplifier path from being saturated. Subsequently, when the preamplifier 230 is again turned on to read, a step function will result. In summary, whether it be large signal from a write current or the non-existent signal from a squelched preamp, the operating point on the high pass filters will not be correct for a subsequent read operation and can adversely affect the baseline voltage. The BCC 272 can be useful to recover from this transient.

Another cause of baseline variations are disk defects that may be encountered during operation. While a defect is present, the baseline could assume the wrong value with the result that the filters are improperly biased after the defect has passed. Once information about the location of the defect is obtained from the error correction circuitry, the control circuit can switch the Enable Low Pass filter input to the BCC to correct the baseline of the signal and therefore aid in recovery from the defect.

Figure 10:
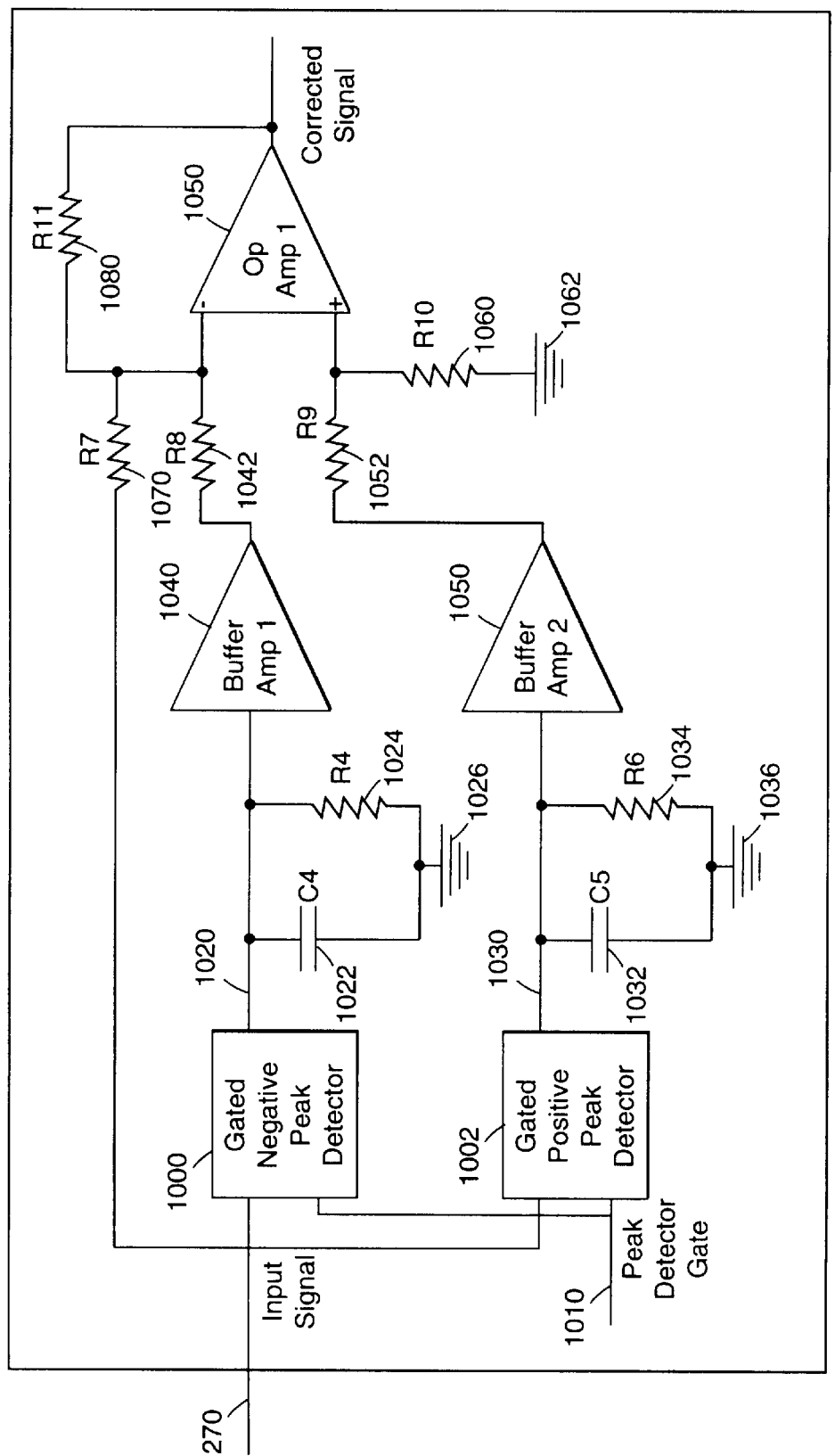
FIG. 10 is an alternate embodiment of the BCC that includes two peak detector circuits.

An alternate implementation may be made with two peak detector circuits as shown in FIG. 10: a Gated Negative Peak Detector 1000 and a Gated Positive Peak Detector 1002. Following each peak detector 1000 and 1002, a capacitor and a resistor are coupled in parallel to ground. Particularly, from the Negative Peak Detector 1000, an output 1020 is coupled to a first low pass filter including a capacitor 1022 having a value C4 and a resistor 1024 having a value R4, that are both coupled to a ground reference 1026. From the Positive Peak Detector 1002, an output 1030 is coupled to a second low pass filter including a capacitor 1032 having a value C5 and a resistor 1034 having a value R5, that are both coupled to a ground reference 1036 that may be the same as the ground reference 1026 for the negative peak detector. The resultant negative peak voltage on line 1020 is applied through a buffer amplifier 1040 and a resistor 1042 having a value R8 to a minus (−) input of an op amp 1050. Likewise, the resultant positive peak voltage on line 1030 is applied through a buffer amplifier 1044 and a resistor 1046 having a value R9 to a plus (+) input of the op amp 1050. Another resistor 1060 having a value R10 is coupled between the plus input of the op amp 1050 and a ground reference 1062. The input signal 220 is applied through a resistor 1070 having a value R7 to the minus input of the op amp 1050. A feedback resistor 1080 is coupled between the minus input and the output of the op amp 1050. A corrected signal is the output from the op amp 1050. When the Peak Detector Gate 1010, which is analogous to the BCC switch 278 enables the two peak detectors 1000 and 1002, the negative and positive peaks are stored on peak holding capacitors 1022 and 1032 respectively. The peak values would then be combined with the input signal 270 to center the signal according to the formula:

$$V_{Corrected\ Signal} = V_{Input\ Signal} + 0.5 \times V_{negativepeak} - 0.5 \times V_{positivepeak}$$

Bleed off resistors 1024 and 1026 allow the voltage on the peak hold capacitors 1022 and 1024 to bleed off at a rate to compensate for the droop of the AC coupling capacitors preceding it in the circuit. The alternate implementation of FIG. 10 has the advantage of being faster to acquire a sample than the preferred circuit of FIG. 4 but it has the disadvantage of being more complex, more expensive, and not being capable of providing a continuous high pass function for backwards compatibility with PPM systems.

The illustrations in this disclosure show single-ended circuits. Both the preferred and alternate implementation can be implemented as differential circuits. The differential implementation of either should be apparent to one skilled in the art once the single-end description is understood.

What is claimed is:

1. A baseline correction circuit for filtering transient baseline variations from a pulse width modulated (PWM) electrical signal, comprising:

a baseline correction circuit (BCC) switch coupled to switch said PWM signal in response to a transient event signal indicating prediction of an upcoming baseline variation;

a low pass filter coupled via said BCC switch to receive said PWM signal, the low pass filter producing a low pass filtered output in response to the transient event signal; and a difference amplifier connected to receive said PWM signal and the lowpass-filtered output, the difference amplifier for providing a difference signal responsive to a difference between said PWM signal and said low pass filter output.

2. The baseline correction circuit of claim 1 wherein said low pass filter includes a first resistor coupled between said BCC switch and said difference amplifier, and a capacitor coupled between said difference amplifier and a ground reference.

3. The baseline correction circuit of claim 2 wherein said low pass filter further includes a second resistor coupled in parallel with said capacitor.

4. The baseline correction circuit of claim 3 wherein said second resistor has a value selected to approximately match a slew rate of said PWM signal.

5. The baseline correction circuit of claim 4 wherein said lowpass filter further includes, in parallel with said capacitor and said second resistor, an inductor, and a third resistor in series with the inductor.

6. A baseline correction circuit for filtering transient baseline variations from a pulse width modulated (PWM) electrical signal, comprising:

a first low pass filter with an output;

a first gated detector coupled to switch said PWM signal to said first low pass filter in response to a first transient event signal indicative of a predicted baseline variation in a first direction in said PWM signal;

a second low pass filter with an output;

a second gated detector coupled to switch said PWM signal to said second low pass filter in response to a second transient event signal indicative of a predicted baseline variation in a second direction in said PWM signal;

a difference amplifier connected to receive said PWM signal, connected to said output of said first low pass filter, and connected to said output of said second low pass filter for providing a corrected signal.

7. The baseline correction circuit of claim 6 wherein the first low pass filter includes a capacitor for storing a negative peak voltage ($V_{negativepeak}$), the second low pass filter includes a capacitor for storing a position peak voltage ($V_{positivepeak}$), and said difference amplifier has an output that approximately centers the PWM signal according to the formula:

$$V_{Corrected\ signal} = V_{PWM\ signal} + (0.5 \times V_{negativepeak}) - (0.5 \times V_{positivepeak}).$$

8. The baseline correction system of claim 6 wherein said first low pass filter includes a second resistor coupled in parallel with said capacitor in said first low pass filter, and said second low pass filter includes a second resistor coupled in parallel with said capacitor in said second low pass filter.

9. The baseline correction system of claim 6 wherein said second resistors have a value selected to compensate for droop in said input PWM signal.

10. The baseline correction circuit of claim 6 wherein said first and second lowpass filters further include, in parallel with said capacitor and said second resistor, an inductor and a resistor coupled in series.

* * * * *

UNITED STATES PATENT AND TRADEMARK OFFICE
CERTIFICATE OF CORRECTION

PATENT NO. : 6,181,177 B1
DATED : January 30, 2001
INVENTOR(S) : Chapman

It is certified that error appears in the above-identified patent and that said Letters Patent is hereby corrected as shown below:

Column 6,
Line 30, change "tape" to -- type --

Signed and Sealed this

Twentieth Day of August, 2002

Attest:

JAMES E. ROGAN
Attesting Officer
Director of the United States Patent and Trademark Office